(12) United States Patent
Han et al.

(10) Patent No.: US 7,928,621 B2
(45) Date of Patent: Apr. 19, 2011

(54) SPEED-VARIABLE SINGLE PHASE INDUCTION MOTOR

(75) Inventors: Seung-Do Han, Gyeonggi-Do (KR); Hyoun-Jeong Shin, Incheon (KR)

(73) Assignee: LG Electronics Inc., Seoul (KR)

( * ) Notice: Subject to any disclaimer, the term of this patent is extended or adjusted under 35 U.S.C. 154(b) by 318 days.

(21) Appl. No.: 12/161,652

(22) PCT Filed: Jan. 23, 2007

(86) PCT No.: PCT/KR2007/000383
§ 371 (c)(1),
(2), (4) Date: Jul. 21, 2008

(87) PCT Pub. No.: WO2007/083974
PCT Pub. Date: Jul. 26, 2007

(65) Prior Publication Data
US 2010/0219704 A1    Sep. 2, 2010

(30) Foreign Application Priority Data
Jan. 23, 2006  (KR) .................. 10-2006-0007011

(51) Int. Cl.
*H02K 7/20* (2006.01)
(52) U.S. Cl. ............. 310/112; 310/114; 310/156.36
(58) Field of Classification Search .......... 310/112–114, 310/156.35–37, 265, 166
See application file for complete search history.

(56) References Cited

U.S. PATENT DOCUMENTS

| | | | | |
|---|---|---|---|---|
| 3,017,553 A | * | 1/1962 | Homan | 318/737 |
| 3,144,597 A | * | 8/1964 | Lee | 318/816 |
| 4,031,421 A | * | 6/1977 | Geiger | 310/112 |
| 4,137,473 A | * | 1/1979 | Pfister | 310/98 |
| 4,168,459 A | * | 9/1979 | Roesel, Jr. | 322/29 |
| 4,373,147 A | * | 2/1983 | Carlson, Jr. | 318/48 |
| 4,375,047 A | * | 2/1983 | Nelson et al. | 318/48 |
| 4,785,213 A | * | 11/1988 | Satake | 310/116 |
| 5,365,153 A | | 11/1994 | Fujita et al. | |
| 5,838,135 A | * | 11/1998 | Satake et al. | 318/771 |
| 5,886,445 A | * | 3/1999 | Hsu | 310/211 |
| 6,737,778 B2 | | 5/2004 | Daikoku et al. | |
| 7,034,500 B2 | * | 4/2006 | Ionel | 318/772 |
| 2004/0174083 A1 | | 9/2004 | Han et al. | |

FOREIGN PATENT DOCUMENTS

| | | |
|---|---|---|
| JP | 6-62597 A | 3/1994 |
| JP | 09-051959 A | 2/1997 |
| JP | 2004-274998 A | 9/2004 |
| KR | 10-2002-0053709 A | 7/2002 |
| KR | 10-2004-0080645 A | 9/2004 |

* cited by examiner

*Primary Examiner* — Thanh Lam
(74) *Attorney, Agent, or Firm* — Birch, Stewart, Kolasch & Birch, LLP

(57) ABSTRACT

A speed-variable single phase induction motor. By a plurality of stators disposed with an interval therebetween and a plurality of magnetic rotors corresponding to the respective stators, the motor implements a high efficiency and a speed-variable performance such as a brushless direct current (BLDC) motor with a low cost without using an expensive inverter driving apparatus.

7 Claims, 4 Drawing Sheets (a) HIGH SPEED ROTATION  (b) MIDDLE SPEED ROTATION  (c) LOW SPEED ROTATION

US 7,928,621 B2

SPEED-VARIABLE SINGLE PHASE INDUCTION MOTOR

TECHNICAL FIELD

The present invention relates to a single phase induction motor, and more particularly, to a speed-variable single phase induction motor capable of implementing a high efficiency and a speed-variable performance such as a brushless direct current (BLDC) motor with a low cost without using an expensive inverter.

BACKGROUND ART

FIG. 1 is a longitudinal section view showing an induction motor in accordance with the conventional art, and FIG. 2 is a cross-section view showing the induction motor of FIG. 1.

Referring to FIGS. 1 and 2, the conventional induction motor comprises a motor casing 10 that forms an appearance; a stator 100 disposed on an inner circumferential surface of the motor casing 10, and having a coil wound thereon in a circumferential direction; an induction rotor 20 rotatably inserted into the stator 100; and a magnetic rotor 30 rotatably inserted between the stator 100 and the induction rotor 20.

The motor casing is implemented as a cylindrical-shaped container having an opening. A cover 10a that covers the opening is coupled to the motor casing 10. A mounting groove 10b is disposed at a lower side of the motor casing 10. A bearing 12 that rotatably supports a rotation shaft 11 is disposed at the mounting groove 10b.

The stator 100 includes a stator core 110 having a predetermined length, and a winding coil 120 wound in the stator core 110 in a circumferential direction.

The stator core 110 is a laminator formed as a plurality of sheets are laminated to one another. The stator core 110 includes a yoke portion 111 having a ring shape of a predetermined width, and a plurality of teeth 112 extending from an inner circumferential surface of the yoke portion 111 with a predetermined length. A slot is formed between the teeth 112 and the teeth 112, and a cavity 110a for inserting the induction rotor 20 into the stator core 110 is formed by each end of the teeth 112.

The winding coil 120 is wound around the teeth 112 with plural times, and is disposed on the slot 113 formed between the teeth 112 and the teeth 112.

The induction rotor 20 includes a rotor core 21 having a cylindrical bar shape of a predetermined length, and a conductor bar 22 inserted into the rotor core 21. The induction rotor 20 is inserted into the cavity 110a of the stator 100.

The rotor core 21 is a laminator formed as a plurality of sheets are laminated to one another. The rotation shaft 11 is coupled to the center of the rotor core 21.

The magnetic rotor 30 includes a magnet 31 having a cylindrical shape of a predetermined thickness, and a holder having a cup shape and supporting the magnet 31. The magnet 31 is rotatably inserted between an inner circumferential surface of the cavity 110a of the stator 100 and an outer circumferential surface of the induction rotor 20.

A bearing groove 32a is disposed at a lower side of the holder 32, and a bearing 33 which rotatably supports the rotation shaft 11 is coupled to the bearing groove 32a. Once the bearing 33 is coupled to the rotation shaft 11, the holder 32 can be freely rotated centering around the rotation shaft 11.

Hereinafter, an operation of the conventional induction motor will be explained.

When power is supplied to the winding coil 120 of the stator 100, a rotating magnetic field is formed. By the generated rotating magnetic field, the magnet rotor 30 is rotated at a synchronous speed.

As the magnetic rotor 30 constituted with a magnet is rotated, a rotating magnetic field having an intensive magnetic flux is generated. The induction rotor 20 is rotated by the generated rotating magnetic field.

As the induction rotor 20 is rotated, the rotation force of the induction rotor 20 is transmitted to parts requiring the rotation force through the rotation shaft 11.

However, the conventional induction motor has the following problems. The conventional induction motor is not sensitive to variation of an external power due to the intensive magnetic flux generated by the magnet 31 of the magnetic rotor 30, so that it is always operated at the same speed. The conventional method such as a voltage phase control requiring a low cost can not be used to vary the rpm of the induction motor. That is, since the induction motor has a limitation in a speed variation, it can not be operated at various speeds without an expensive inverter driving apparatus.

DISCLOSURE OF THE INVENTION

Therefore, it is an object of the present invention to provide a speed-variable single phase induction motor capable of implementing a high efficiency and a speed-variable performance such as a brushless direct current (BLDC) motor with a low cost without using an expensive inverter driving apparatus.

To achieve these objects, there is provided a speed-variable single phase induction motor, comprising: a motor casing; a rotation shaft rotatably coupled to the motor casing; an induction rotor having a rotor core rotated with being integrally coupled to the rotation shaft, and having a conductor bar inserted into the rotor core; a plurality of stators having cavities for inserting the induction rotor, disposed with an interval therebetween towards the rotation shaft, and partially or totally forming a rotating magnetic field; and a plurality of magnetic rotors inserted between the stators and the induction rotor, rotatably coupled to the rotation shaft, and respectively corresponding to the stators.

According to another aspect of the present invention, there is provided a speed-variable single phase induction motor, comprising: a motor casing; a rotation shaft rotatably coupled to the motor casing; an induction rotor having a rotor core rotated with being integrally coupled to the rotation shaft, and having a conductor bar inserted into the rotor core; a plurality of stators having cavities for inserting the induction rotor, and disposed with an interval therebetween towards the rotation shaft; a plurality of magnetic rotors inserted between the stators and the induction rotor, rotatably coupled to the rotation shaft, and respectively corresponding to the stators; and a control unit which selectively supplies or cuts-off power to/from the stators so that the stators may partially or totally form a rotating magnetic field.

MODES FOR CARRYING OUT THE PREFERRED EMBODIMENTS

Reference will now be made in detail to the preferred embodiments of the present invention, examples of which are illustrated in the accompanying drawings.

A hybrid induction motor according to the present invention will be explained in more detail.

Figure 1:
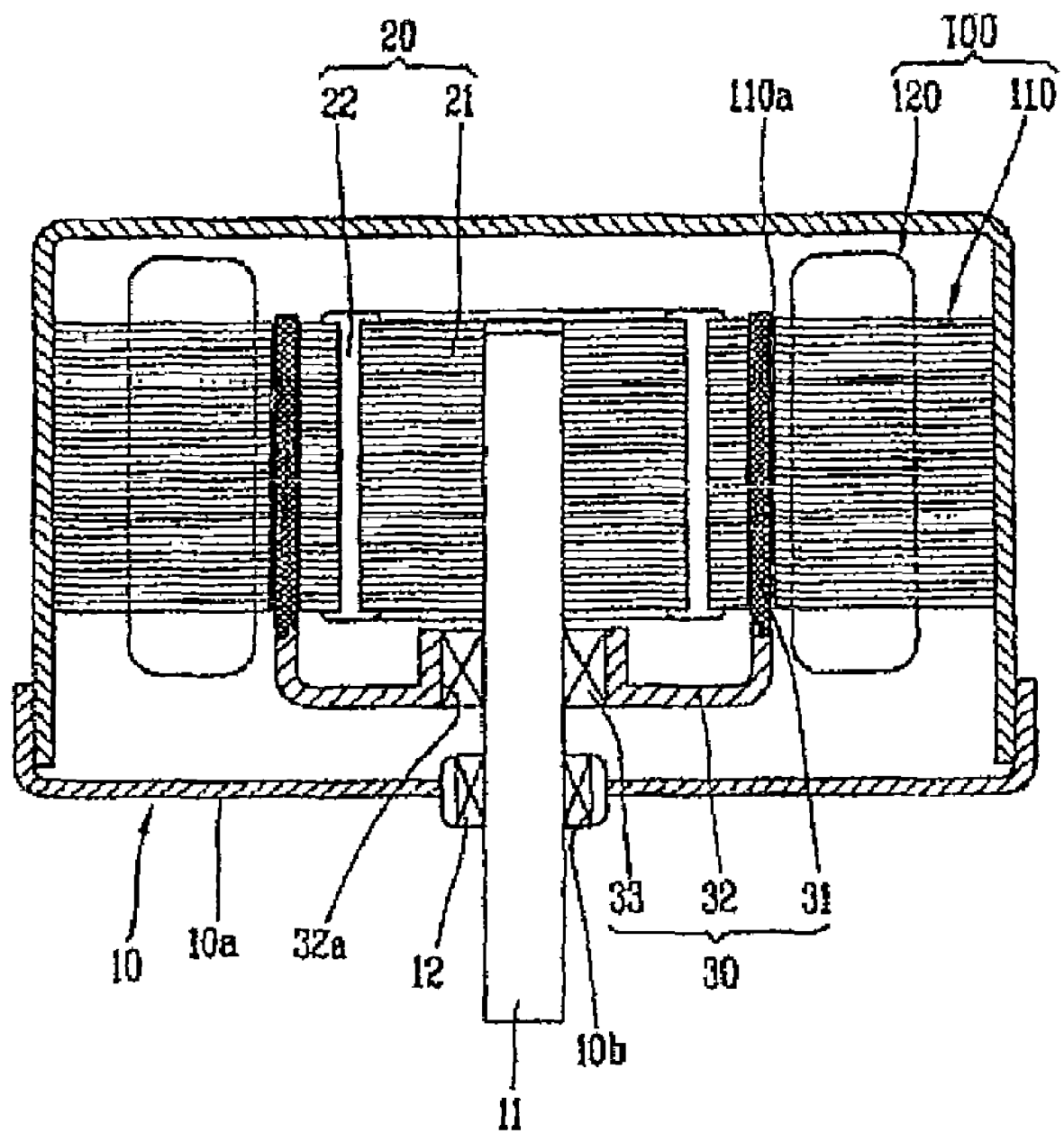
FIG. 1 is a longitudinal section view showing an induction motor in accordance with the conventional art.
Figure 2:
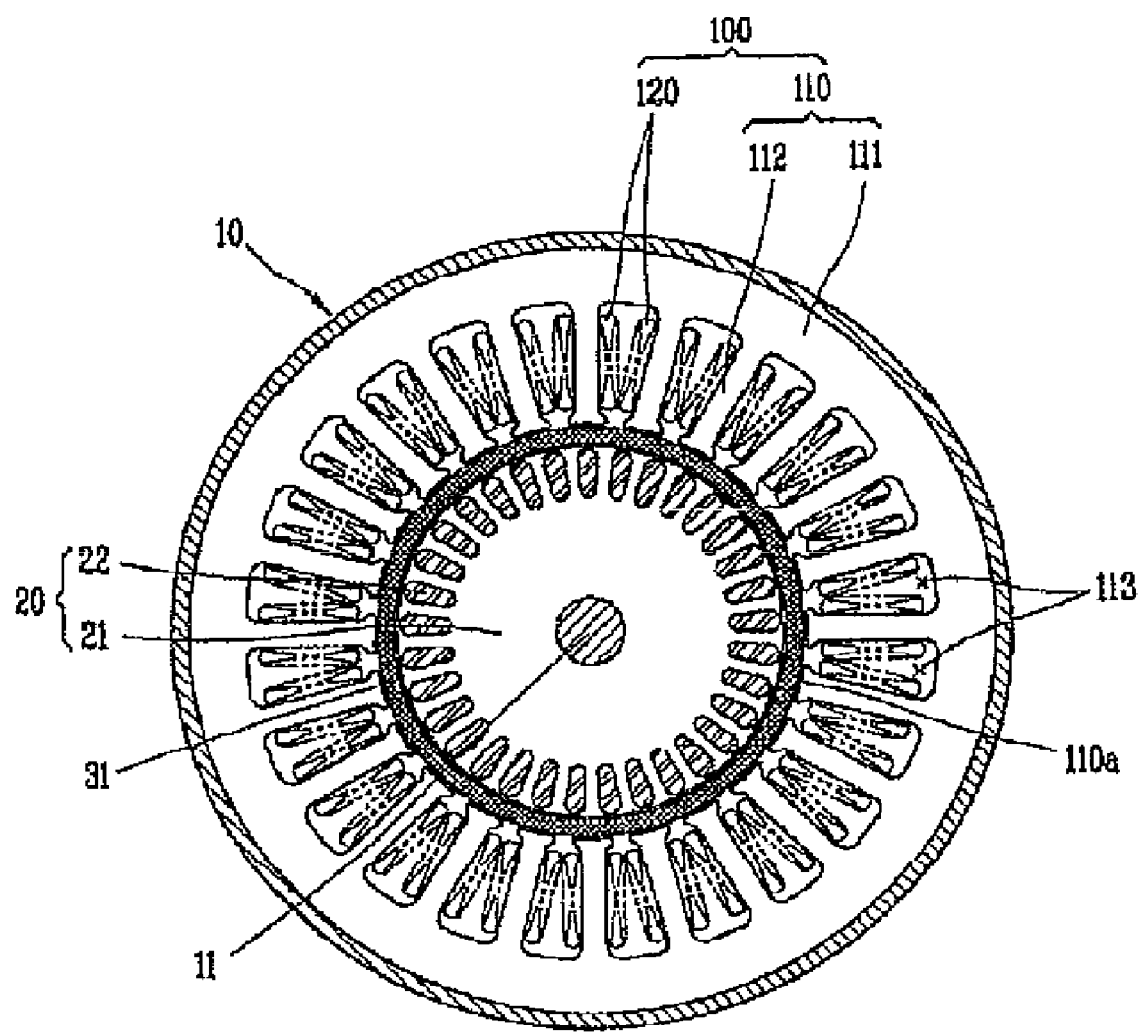
FIG. 2 is a cross-section view of the induction motor of FIG. 1.
Figure 3:
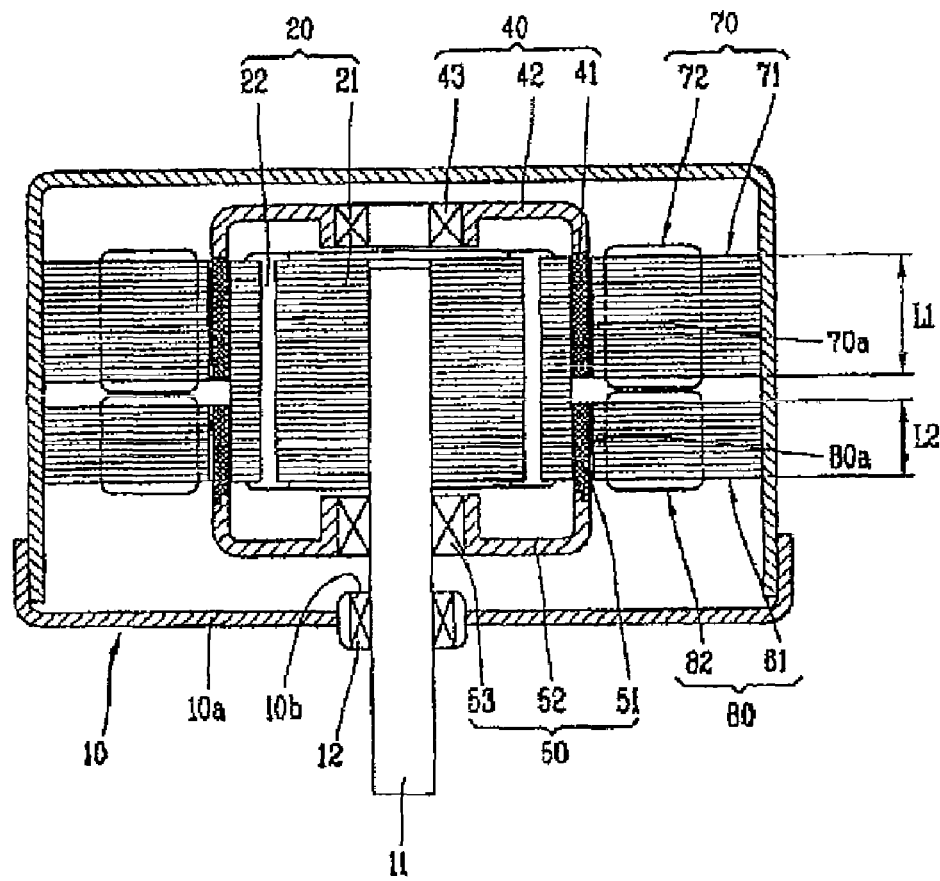
FIG. 3 is a longitudinal section view showing a speed-variable single phase induction motor according to an embodiment of the present invention.
Figure 4:
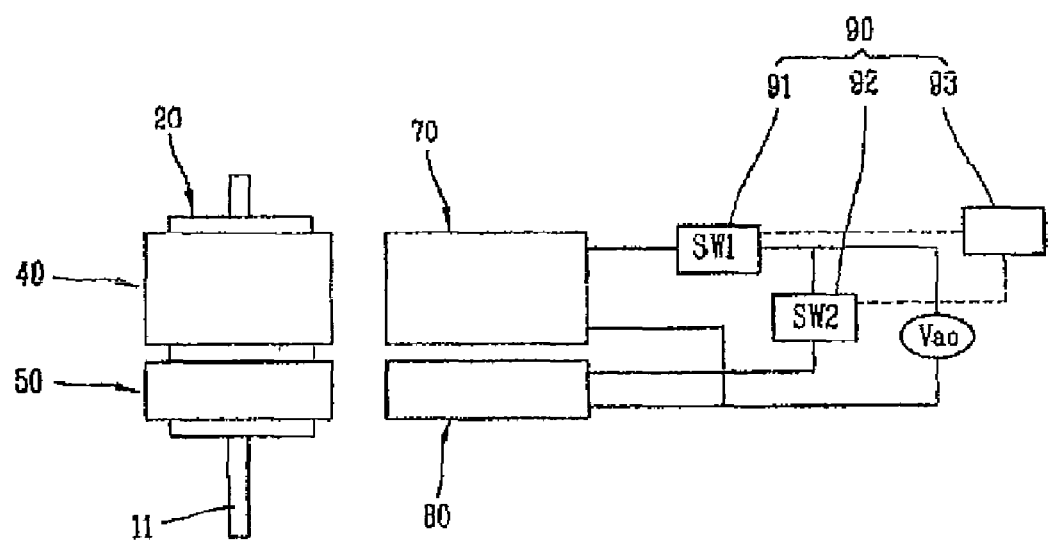
FIG. 4 is a block diagram showing the speed-variable single phase induction motor of FIG. 3.
Figure 5:
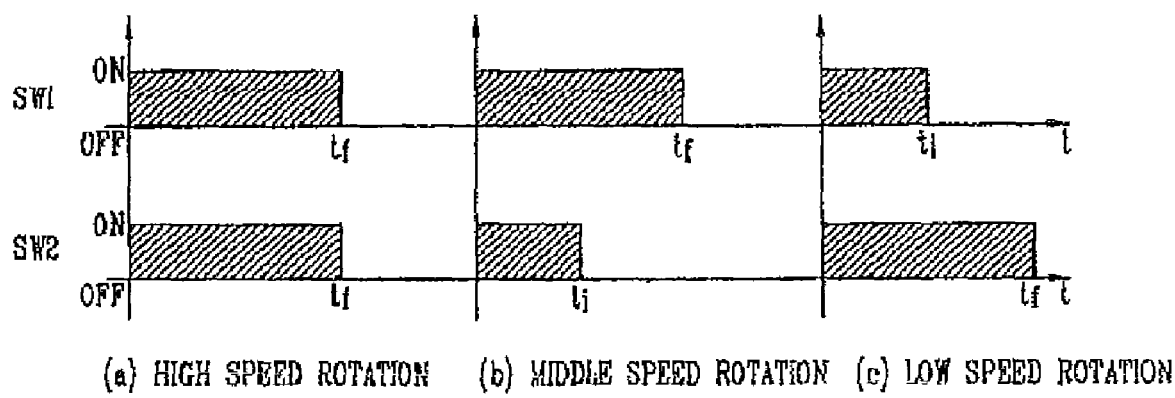
FIG. 5 is a graph showing each operation of a first switch and a second switch when the speed-variable single phase induction motor of FIG. 3 is operated at a high speed, a middle speed, and a low speed.

FIG. 3 is a longitudinal section view showing a speed-variable single phase induction motor according to an embodiment of the present invention, FIG. 4 is a block diagram showing the speed-variable single phase induction motor of FIG. 3, and FIG. 5 is a graph showing each operation of a first switch and a second switch when the speed-variable single phase induction motor of FIG. 3 is operated at a high speed, a middle speed, and a low speed.

The same reference numerals are provided to the same parts as the aforementioned parts, and thus their detailed explanation will be omitted.

Referring to FIGS. 3 and 4, the speed-variable single phase induction motor according to the present invention comprises a motor casing 10; a rotation shaft 11 rotatably coupled to the motor casing 10; an induction rotor 20 having a rotor core 21 rotated with being integrally coupled to the rotation shaft 11, and having a conductor bar 22 inserted into the rotor core 21; a plurality of stators 70 and 80 having cavities 70a and 80a for inserting the induction rotor 20, disposed with an interval therebetween towards the rotation shaft 11, and partially or totally forming a rotating magnetic field; a plurality of magnetic rotors 40 and 50 inserted between the stators 70 and 80 and the rotor core 21, rotatably coupled to the rotation shaft 11, and respectively corresponding to the stators 70 and 80; and a control unit 90 which selectively supplies power to the stators 70 and 80 so that the stators 70 and 80 may partially or totally form a rotating magnetic field.

The plurality of stators 70 and 80 include a first stator 70, and a second stator 80 having a length shorter than a length of the first stator 70 in a direction of the rotation shaft 11. As a length L1 of the first stator 70 is longer than a length L2 of the second stator 80, a rotating magnetic field generated by the first stator 70 is greater than a rotating magnetic field generated by the second stator 80. When the rotation shaft 11 is rotated by supplying power only to the first stator 70, a larger rotating magnetic field is generated than when the rotation shaft 11 is rotated by supplying power only to the second stator 80, and thus the rotation shaft 11 is relatively faster rotated. When power is supplied to the first stator 70 and the second stator 80, the rotation shaft 11 is the fastest rotated since the rotating magnetic fields generated by the first stator 70 and the second stator 80 are synthesized to each other. Accordingly, the speed of the rotation shaft 11 can be controlled.

The first stator 70 is provided with a first stator core 71 and a first winding coil 72. The first stator care 71 is formed as a plurality of sheets are laminated to one another, the each sheet having a cavity 70a at the center thereof. The first winding coil 72 is wound on the first stator core 71 thus to generate a rotating magnetic field.

The second stator 80 is disposed below the first stator 70, and has a second stator core 81 and a second winding coil 82.

The second stator core 81 is formed as a plurality of sheets are laminated to one another, the each sheet having a cavity 80a at the center thereof. The second winding coil 82 is wound on the second stator core 81 thus to generate a rotating magnetic field.

The magnetic rotors 40 and 50 include a first magnetic rotor 40 having a length corresponding to the length L1 of the first stator 70 in a direction of the rotation shaft 11, and a second magnetic rotor 50 having a length corresponding to the length L2 of the second stator 80 in a direction of the rotation shaft 11.

The first magnetic rotor 40 includes a first magnet 41 having a predetermined thickness and a cylindrical shape, and a first holder 42 having a cup shape and supporting the first magnet 41. The first magnet 41 is rotatably inserted between an inner circumferential surface of the cavity 70a of the first stator 70 and an outer circumferential surface of the induction rotor 20. A first bearing 43 is coupled to one side of the first holder 42, and the first bearing 43 is coupled to the rotation shaft 11. As the first bearing 43 is coupled to the rotation shaft 11, the first holder 42 is freely rotated on the rotation shaft 11.

The second magnetic rotor 50 is disposed below the first magnetic rotor 40. The second magnetic rotor 50 includes a second magnet 51 having a predetermined thickness and a cylindrical shape, and a second holder 52 having a cup shape and supporting the second magnet 51.

The second magnet 51 is rotatably inserted between an inner circumferential surface of the cavity 80a of the second stator 80 and an outer circumferential surface of the induction rotor 20. A second bearing 53 is coupled to one side of the second holder 52, and the second bearing 53 is coupled to the rotation shaft 11. As the second bearing 53 is coupled to the rotation shaft 11, the second holder 52 is freely rotated on the rotation shaft 11.

Referring to FIGS. 4 and 5, the control unit 90 includes a first switch 91 that supplies or cuts-off power (Vac) to/from the first stator 70, a second switch 92 that supplies or cuts-off power (Vac) to/from the second stator 80, and a judge unit 93 that controls an operation of the first switch 91 or the second switch 92.

The first switch 91 is implemented as a relay or a silicon control rectifier (SCR) so as to supply or cut-off power to/from the first winding coil 72 of FIG. 3 of the first stator 70.

The second switch 92 is implemented as a relay or a silicon control rectifier (SCR) so as to supply or cut-off power to/from the second winding coil 82 of FIG. 3 of the second stator 80.

The judge unit 93 is implemented as a programmable microcomputer, and controls each operation of the first switch 91 and the second switch 92. When rotating the rotation shaft 11 at a high speed, the judge unit 93 turns on both the first switch 91 and the second switch 92 until a driving finishing time (tf). When rotating the rotation shaft 11 at a low speed, the judge unit 93 turns on only the second switch 92 until the driving finishing time (tf). The judge unit 93 turns on both the first switch 91 and the second switch 92 until an initial driving time (ti) so as to obtain an initial driving torque of the speed-variable single phase induction motor.

Referring to FIGS. 4 and 5, a high-speed driving mode of the speed-variable single phase induction motor will be explained.

The judge unit 93 turns on both the first switch 91 and the second switch 92 until the driving finishing time (tf).

Once the first switch 91 is turned ON, power is supplied to the first winding coil 72 of the first stator 70 thus to generate a rotating magnetic field. The first magnetic rotor 40 is rotated at a synchronous speed by the generated rotating magnetic field. As the first magnetic rotor 40 is rotated, a rotating magnetic field having an intensive magnetic flux is generated since the first magnetic rotor 40 is constituted with the first magnet 41.

Once the second switch 92 is turned ON, power is supplied to the second winding coil 82 of the second stator 80 thus to generate a rotating magnetic field. The second magnetic rotor 50 is rotated at a synchronous speed by the generated rotating magnetic field. As the second magnetic rotor 50 is rotated, a rotating magnetic field having an intensive magnetic flux is generated since the second magnetic rotor 50 is constituted with the second magnet 51.

Herein, the rotating magnetic field generated by the first stator 70 and the rotating magnetic field generated by the second stator 80 are synthesized to each other, thereby rotating the induction rotor 20 at a high speed.

As the induction rotor 20 is rotated at a high speed, the rotation force of the induction rotor 20 is transmitted to parts requiring the rotation force through the rotation shaft 11 with a high speed.

Referring to FIGS. 4 and 5, a middle-speed driving mode of the speed-variable single phase induction motor will be explained.

The judge unit 93 turns on both the first switch 91 and the second switch 92 until the initial driving time (ti) so as to obtain an initial driving torque of the speed-variable single phase induction motor. Then, the judge unit 93 turns on only the first switch 91 until the driving finishing time (tf).

Once the first switch 91 is turned on, power is supplied to the first winding coil 72 of the first stator 70 thus to generate a rotating magnetic field. The first magnetic rotor 40 is rotated at a synchronous speed by the generated rotating magnetic field. As the first magnetic rotor 40 is rotated, a rotating magnetic field having an intensive magnetic flux is generated since the first magnetic rotor 40 is constituted with the first magnet 41.

Since the rotating magnetic field is generated only by the first stator 70, the induction rotor 20 is rotated at a middle speed. As the induction rotor 20 is rotated at a middle speed, the rotation force of the induction rotor 20 is transmitted to parts requiring the rotation force through the rotation shaft 11 with a middle speed.

Referring to FIGS. 4 and 5, a low-speed driving mode of the speed-variable single phase induction motor will be explained.

The judge unit 93 turns on both the first switch 91 and the second switch 92 until the initial driving time (ti) so as to obtain an initial driving torque of the speed-variable single phase induction motor. Then, the judge unit 93 turns on only the second switch 92 until the driving finishing time (tf).

Once the second switch 92 is turned on, power is supplied to the second winding coil 82 of the second stator 80 thus to generate a rotating magnetic field. The second magnetic rotor 50 is rotated at a synchronous speed by the generated rotating magnetic field. As the second magnetic rotor 50 is rotated, a rotating magnetic field having an intensive magnetic flux is generated since the second magnetic rotor 50 is constituted with the second magnet 51.

Since the rotating magnetic field is generated only by the second stator 80, the induction rotor 20 is rotated at a low speed. As the induction rotor 20 is rotated at a low speed, the rotation force of the induction rotor 20 is transmitted to parts requiring the rotation force through the rotation shaft 11 with a low speed.

In conclusion, the speed-variable single phase induction motor can implement a high speed, a middle speed, and a low speed without using an expensive inverter driving apparatus.

The speed-variable single phase induction motor can implement various speeds by comprising a third magnetic rotor inserted between the first magnetic rotor 40 and the second magnetic rotor 50, a third stator, and a third switch that supplies or cuts-off power to/from the third stator.

The speed-variable single phase induction motor according to the present invention may be applied to any speed-variable motor with a low cost.

It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A speed-variable single phase induction motor, comprising:
   a motor casing;
   a rotation shaft rotatably coupled to the motor casing;
   an induction rotor having a rotor core rotated with being integrally coupled to the rotation shaft, and having a conductor bar inserted into the rotor core;
   a plurality of stators having cavities for inserting the induction rotor, disposed with an interval therebetween towards the rotation shaft, and partially or totally forming a rotating magnetic field; and
   a plurality of magnetic rotors including a magnet and a holder, inserted between the stators and the induction rotor, rotatably coupled to the rotation shaft, and respectively corresponding to the stators,
   wherein each magnet is rotatably inserted between an inner circumferential surface of the cavity of each stator and an outer surface of the induction rotor.

2. The speed-variable single phase induction motor of claim 1, wherein one group of the stator and the magnetic rotor corresponding to each other has a length different from that of another group of the stator and the magnetic rotor corresponding to each other in a direction of the rotation shaft.

3. The speed-variable single phase induction motor of claim 1, wherein the plurality of stators comprise:
   a first stator; and
   a second stator having a length shorter than that of the first stator in a direction of the rotation shaft, wherein the plurality of magnetic rotors comprise:
   a first magnetic rotor having a length corresponding to the length of the first stator in a direction of the rotation shaft; and
   a second magnetic rotor having a length corresponding to the length of the second stator in a direction of the rotation shaft.

4. A speed-variable single phase induction motor, comprising:
   a motor casing;
   a rotation shaft rotatably coupled to the motor casing;
   an induction rotor having a rotor core rotated with being integrally coupled to the rotation shaft, and having a conductor bar inserted into the rotor core;
   a plurality of stators having cavities for inserting the induction rotor, and disposed with an interval therebetween towards the rotation shaft;
   a plurality of magnetic rotors including a magnet and a holder, inserted between the stators and the induction rotor, rotatably coupled to the rotation shaft, and respectively corresponding to the stators; and a control unit which selectively supplies power to the stators so that the stators may partially or totally form a rotating magnetic field, wherein each magnet is rotatably inserted between an inner circumferential surface of the cavity of each stator and an outer surface of the induction rotor.

5. The speed-variable single phase induction motor of claim 4, wherein one group of the stator and the magnetic rotor corresponding to each other has a length different from that of another group of the stator and the magnetic rotor corresponding to each other in a direction of the rotation shaft.

6. The speed-variable single phase induction motor of claim 4, wherein the plurality of stators comprise:
 a first stator; and
 a second stator having a length shorter than that of the first stator in a direction of the rotation shaft, wherein the plurality of magnetic rotors comprise:
 a first magnetic rotor having a length corresponding to the length of the first stator in a direction of the rotation shaft; and
 a second magnetic rotor having a length corresponding to the length of the second stator in a direction of the rotation shaft.

7. The speed-variable single phase induction motor of claim 6, wherein the control unit comprises:
 a first switch which supplies or cuts-off power to/from the first stator;
 a second switch which supplies or cuts-off power to/from the second stator; and
 a judge unit which controls each operation of the first switch and the second switch.

* * * * *